United States Patent
Matsushiro et al.

(10) Patent No.: US 6,243,416 B1
(45) Date of Patent: Jun. 5, 2001

(54) IMAGE CODING AND DECODING METHODS, IMAGE CODER, AND IMAGE DECODER

(75) Inventors: Nobuhito Matsushiro; Yoshihiko Yoshida, both of Tokyo (JP)

(73) Assignee: Oki Data Corporation, Tokyo (JP)

(*) Notice: Subject to any disclaimer, the term of this patent is extended or adjusted under 35 U.S.C. 154(b) by 0 days.

(21) Appl. No.: 09/499,334

(22) Filed: Feb. 4, 2000

Related U.S. Application Data

(63) Continuation of application No. 09/027,092, filed on Feb. 20, 1998.

(51) Int. Cl.[7] .................................................. H04N 7/12
(52) U.S. Cl. ........................ 375/240; 382/172; 382/181; 382/190
(58) Field of Search ............................. 375/240; 348/396, 348/392, 395; 382/251, 283, 176

(56) References Cited

U.S. PATENT DOCUMENTS

| | | |
|---|---|---|
| 5,396,584 | 3/1995 | Lee et al. .............................. 395/132 |
| 5,453,787 * | 9/1995 | Hancock et al. ...................... 348/391 |
| 5,465,118 * | 11/1995 | Hancock et al. ...................... 348/396 |
| 5,604,499 | 2/1997 | Miyagoshi et al. ..................... 341/67 |
| 5,613,015 * | 3/1997 | Suzuki et al. ......................... 382/173 |
| 5,617,333 | 4/1997 | Oyamada et al. ..................... 364/514 |
| 5,668,646 | 9/1997 | Katayama et al. .................... 358/530 |
| 5,724,097 | 3/1998 | Hibi et al. ............................. 395/132 |
| 5,768,438 * | 6/1998 | Etoh ..................................... 382/251 |
| 5,798,719 | 8/1998 | Wise et al. .............................. 341/67 |
| 5,815,287 * | 9/1998 | Yamada ................................. 358/458 |
| 5,854,853 * | 12/1998 | Wang ..................................... 382/176 |

* cited by examiner

*Primary Examiner*—Andy Rao
*Assistant Examiner*—Shawn An
(74) *Attorney, Agent, or Firm*—Akin, Gump, Strauss, Hauer & Feld, L.L.P.

(57) ABSTRACT

An image is divided into blocks and coded by matching each block with a pattern having either a single region, or two or more regions defined by internal edges. The coded value of the block includes a pattern identifier, and a single pixel value for each region in the matching pattern. The coded image is decoded by constructing blocks divided into regions according to the pattern identifiers, and filling each region with the given single pixel value. The decoded blocks may be the same size as the blocks in the original image, or smaller, in which case the decoded image is reduced, or larger, in which case the decoded image is enlarged.

26 Claims, 13 Drawing Sheets

FIG. 4

| INTERCEPT INFORMATION | PATTERN NO. | PATTERN |
|---|---|---|
| 00000000B | 0 = 000000B | |
| 01010000B | 1 = 000001B | |
| 01100000B | 2 = 000010B | |
| ⋮ | ⋮ | ⋮ |
| 00001110B | 53 = 110101B | |
| 00001111B | 54 = 110110B | |

FIG. 14

| PATTERN NO. | PATTERN |
|---|---|
| 0 | |
| 1 | |
| 2 | |
| ⋮ | ⋮ |
| 10 | |
| ⋮ | ⋮ |
| 53 | |
| 54 | |

FIG. 15
| PATTERN NO. | PATTERN |
|---|---|
| 0 | 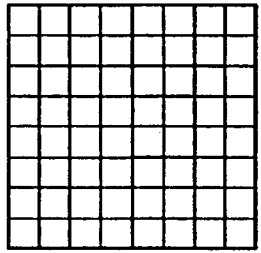 |
| 1 | 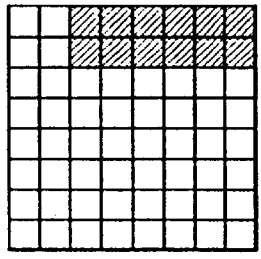 |
| 2 | 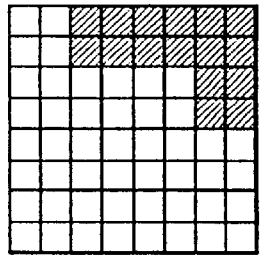 |
| ⋮ | ⋮ |
FIG. 16
| E | C | M | Y | K |

IMAGE CODING AND DECODING METHODS, IMAGE CODER, AND IMAGE DECODER

CROSS REFERENCE TO RELATED APPLICATION

This application is a continuation of co-pending application Ser. No. 09/027,092 filed Feb. 20, 1998.

BACKGROUND OF THE INVENTION

The present invention relates to methods for coding and decoding an image by dividing the image into blocks, and to an image coder and image decoder employing these methods.

Data compression is a field of intense interest, because it is an enabling technology for multimedia. Image data compression methods have been standardized by the Telecommunication Standardization Sector of the International Telecommunication Union (ITU-T), and by the International Organization for Standardization and the International Electrotechnical Commission (ISO/IEC). For still images, the method advocated by the Joint Photographic Experts Group (JPEG) has been adopted in ITU-T recommendations T.81 and T.83 and ISO/IEC standard 10918. For moving images, methods advocated by the Moving Picture Experts Group (MPEG) have been adopted in ISO/IEC standard 11172 (MPEG1) and ISO/IEC standard 13818 (MPEG2).

The JPEG and MPEG methods divide an image into blocks, and compress each block separately by a combination of the discrete cosine transform, quantization, and entropy coding. These techniques require complex calculations and much memory access, however, so their speed is limited, and an image coding and decoding apparatus (codec) employing the JPEG and MPEG methods is comparatively large and expensive.

In addition, the JPEG and MPEG methods are not directly applicable when the decoded image is reduced or enlarged by changing the image resolution; that is, by changing the number of picture elements (pixels) in the image. Resolution conversion has to be performed as a separate operation, following image decoding.

SUMMARY OF THE INVENTION

It is accordingly an object of the present invention to provide high-speed methods of coding and decoding an image by dividing the image into blocks.

Another object of the invention is to provide a small and inexpensive image coder.

Another object is to provide a small an inexpensive image decoder.

Yet another object is to provide an image decoder that can change the image resolution while decoding the image.

The invented image coding method employs a table of predetermined patterns identical in size and shape to the blocks into which the image divided. One pattern is made up of a single region; the other patterns are made up of two or more regions, defined by internal edges. The patterns are identified by pattern identifiers.

Each block in the image is matched with one of the patterns in the table by detecting internal edges in the block. The block is thereby partitioned into regions matching the regions in the pattern. One representative pixel value, e.g. an average value, is calculated for each region in the block. The block is coded as the pattern identifier of the matching pattern, and the representative pixel value of each region.

The invented image coder comprises a coding parameter memory having the above table, an edge detector, a partitioner for partitioning a block into regions as in the matching pattern, a pixel value calculator for calculating the representative pixel values, and a code assembler for assembling the coded image information.

The invented image decoding method employs at least one table of predetermined patterns, similar to the table used in the invented coding method. Each block is divided into regions according to the pattern identifier given in the coded image information, and each region is filled with the corresponding representative pixel value.

The image decoding method may employ a plurality of tables, each storing patterns of a different size. For example, one table may store the same patterns as used in coding the image, another table may store smaller patterns, and another table may store larger patterns. One of the tables is selected in response to mode information.

The invented image decoder comprises a decoding parameter memory having the above table or tables, and a fill processor for filling regions with representative pixel values.

The invented image coding and decoding methods are fast because they require comparatively little memory access, and involve no complex mathematical operations. For the same reasons, the invented image coder and decoder are small and inexpensive.

If the decoder has a plurality of tables, the image can be reduced or enlarged, as selected by the mode information, with no extra operations.

BRIEF DESCRIPTION OF THE DRAWINGS

In the attached drawings:

FIG. 4 is a chart illustrating patterns of regions in a block;

FIG. 14 is a chart illustrating reduced patterns employed in the fifth embodiment;

FIG. 15 is a chart illustrating enlarged patterns employed in the fifth embodiment; and FIG. 16 illustrates a codeword in a variation of the first embodiment.

DETAILED DESCRIPTION OF THE INVENTION

Embodiments of the invention will be described with reference to the attached exemplary drawings.

Figure 1:
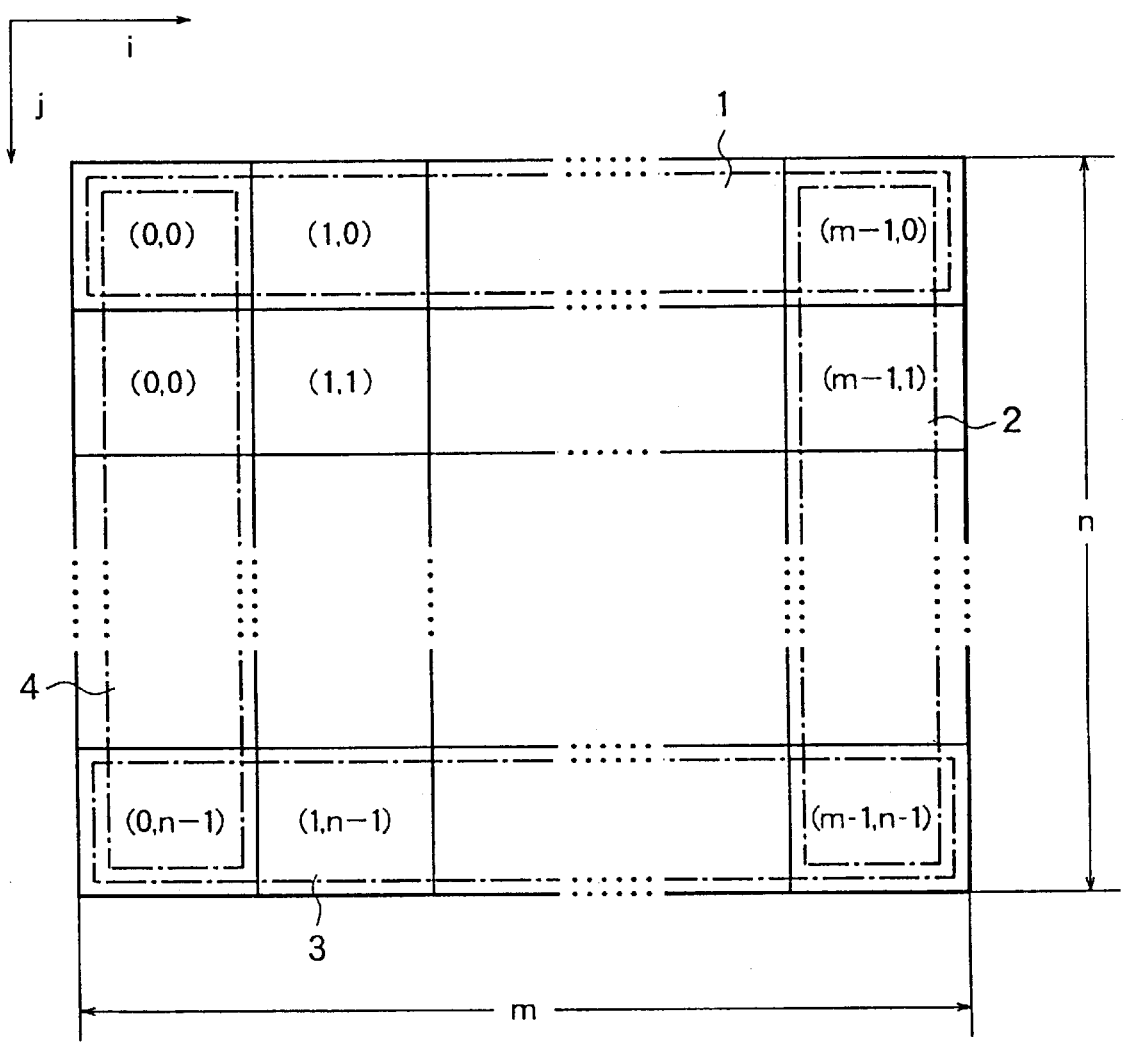
FIG. 1 illustrates a block of pixels.

In all of the following embodiments, the image coding process divides an image into m-by-n blocks of pixels as shown in FIG. 1, where m and n are positive integers. Pixels will be denoted by their coordinates in the block, using the notation P(i, j), where i is an integer from 0 to m−1, and j is an integer from 0 to n−1. In an ink-jet printer, for example, the i coordinate corresponds to the position of the printing head, and the j coordinate to the position of the printing medium.

The four sides of the block are numbered in clockwise order. The first side 1 is the top side, comprising the following pixels.

P(0, 0), P(1, 0), . . . , P(m−1, 0)

The second side 2 is the right side, comprising the following pixels.

P(m−1, 0), P(m−1, 1), . . . , P(m−1, n−1)

The third side 3 is the bottom side, comprising the following pixels.

P(0, n−1), P(1, n−1), . . . , P(m−1, n−1)

The fourth side 4 is the left side, comprising the following pixels.

P(0, 0), P(0, 1), . . . , P(0, n−1)

It will be assumed that the image is a color image in which each pixel has separate eight-bit values for the colors cyan (C), magenta (M), yellow (Y), and black (K). These values will be denoted C(i, j), M(i, j), Y(i, J), and K(i, j), and referred to collectively as the pixel value of pixel P(i, j).

The invention is not limited to the CMYK color coding scheme, but can be practiced with other schemes, such as the red-green-blue (RGB) scheme, or the color-difference scheme widely used in color television. The invention can also be practiced with monochrome or gray-scale images.

Each m-by-n image block is coded separately, so only the coding of one block will be described below.

Figure 2:
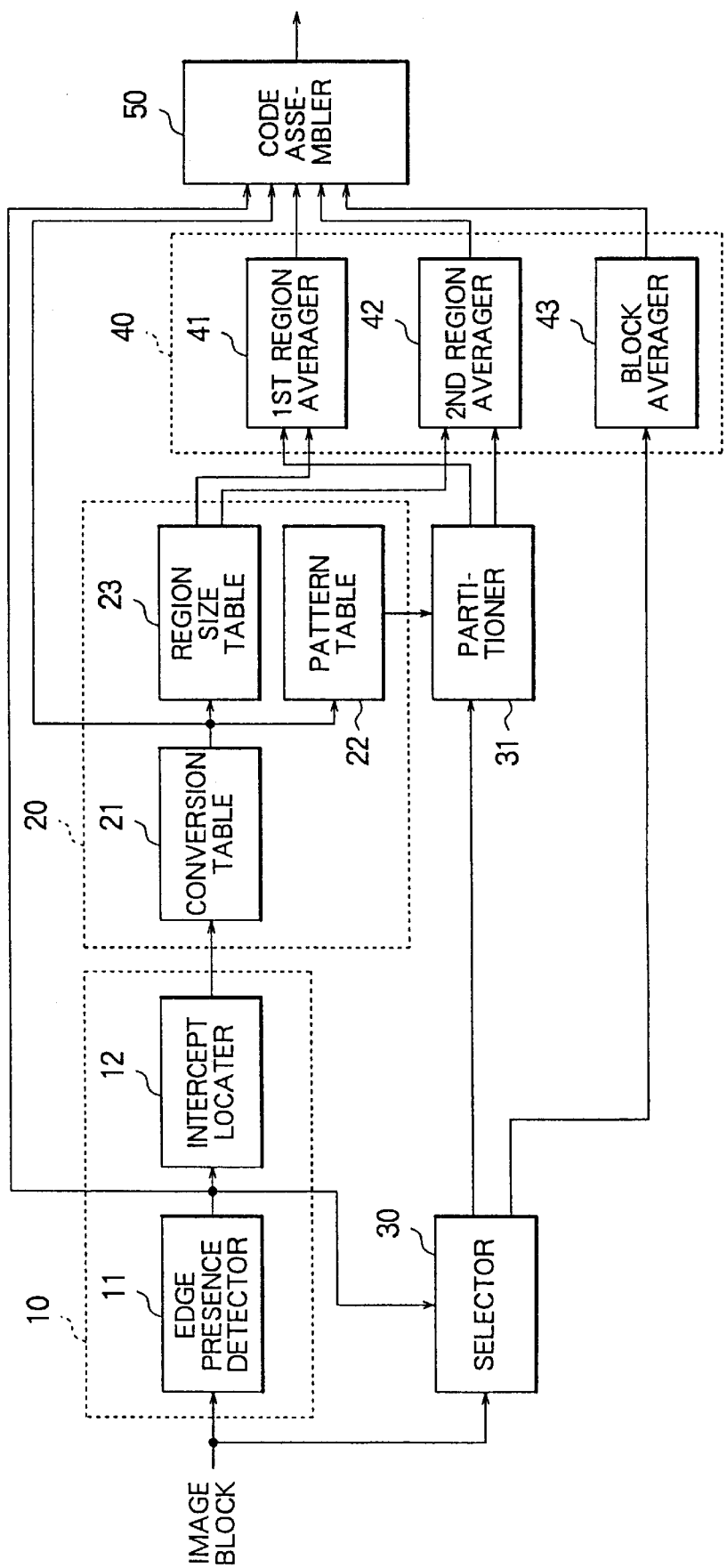
FIG. 2 is a block diagram of an image coder according to a first embodiment of the invention.

Referring to FIG. 2, the first embodiment is an image coder comprising an edge detector 10, a coding parameter memory 20, a selector 30, a partitioner 31, a pixel value calculator 40, and a code assembler 50.

The input image block is first received by the edge detector 10, which comprises an edge presence detector 11 and an intercept locator 12. The edge presence detector 11 determines whether an internal edge is present in the block. If an internal edge is present, the intercept locator 12 determines the location of the edge. An edge is, generally speaking, a boundary at which there is a steep change in pixel values. The edge detector 10 detects internal edges as follows.

For each of the four pixels at the four corners of the block, the edge presence detector 11 calculates the following total pixel value F(i, j).

F(i, j)=C(i, j)+M(i, j)+Y(i, j)+K(i, j)

From these values, the edge presence detector 11 calculates an absolute difference across each side of the block, as follows.

H(1)=|F(0, 0)−F(m−1, 0)|

H(2)=|F(m−1, 0)−F(m−1, n−1)|

H(3)=|F(m−1, n−1)−F(0, n−1)|

H(4)=|F(0, n−1)−F(0 , 0)|

The edge presence detector 11 then selects the two largest of these absolute differences and compares them with a threshold (k).

If both of the two largest differences exceed the threshold, the edge presence detector 11 outputs a four-bit side code in which the two bits corresponding to the sides with the largest absolute differences are set to one, indicating that an edge is present and that the edge intercepts these two sides of the block. For example, if the largest absolute differences are H(1) and H(2), the side code value '1100' is output, indicating an edge that intercepts the first and second sides. If the largest absolute differences are H(1) and H(3), the side code value is '1010.'

If one or both of the two largest absolute differences does not exceed the threshold, the edge presence detector 11 outputs an all-zero code ('0000') to indicate that the block does not contain an edge.

The threshold (k) is a design parameter that can be lowered to increase the probability of detecting an edge, or raised to decrease this probability.

The edge presence detector 11 also generates an edge detection result bit that is set to one when an internal edge is detected, and cleared to zero when no edge is detected. This edge detection result bit, or E bit, is sent to the intercept locator 12, the selector 30, and the code assembler 50.

When the edge presence detector 11 outputs a non-zero edge detection result bit, the intercept locator 12 compares the pixel values on each of the two sides indicated by the side code to find where the edge intercepts those two sides. The intercept points are located by finding where the total pixel value changes most greatly, as indicated by the absolute difference between adjacent pixel values. For example, if one of the indicated sides is the first side 1, the intercept locator 12 finds the following maximum (max) absolute difference.

max|F(i−1, 0)−F(i, 0)| (i=1 1 to m−1)

The intercept locator 12 sends the coding parameter memory 20 intercept information indicating the location of the intercept point on each indicated side. For an intercept point on the first side 1, for example, the information output by the intercept locator 12 indicates a value of i for which the above maximum absolute difference is found. If no edge is present, the intercept locator 12 outputs all-zero information.

The coding parameter memory 20 comprises three tables: a conversion table 21, a pattern table 22, and a region size table 23.

The intercept information output by the intercept locator 12 is used as an address in the conversion table 21. The conversion table 21 stores pattern numbers that are used as offset addresses in the pattern table 22 and region size table 23, and are also supplied to the code assembler 50. When the intercept locator 12 outputs intercept information, the conversion table 21 outputs the corresponding pattern number.

The pattern table 22 stores predetermined patterns identical in size and shape to the blocks into which the image is divided. Each pattern is divided into two regions, a region of zeros and a region of ones, defined by an internal edge of the type detected by the edge detector 10. The pattern table 22 also stores one all-zero pattern. The pattern table 22 outputs the pattern stored at the address given by the pattern number output from the conversion table 21.

The region size table 23 stores the number of zeros and the number of ones in each pattern in the pattern table 22, and outputs these two numbers in response to the pattern number given by the conversion table 21.

Figure 3:
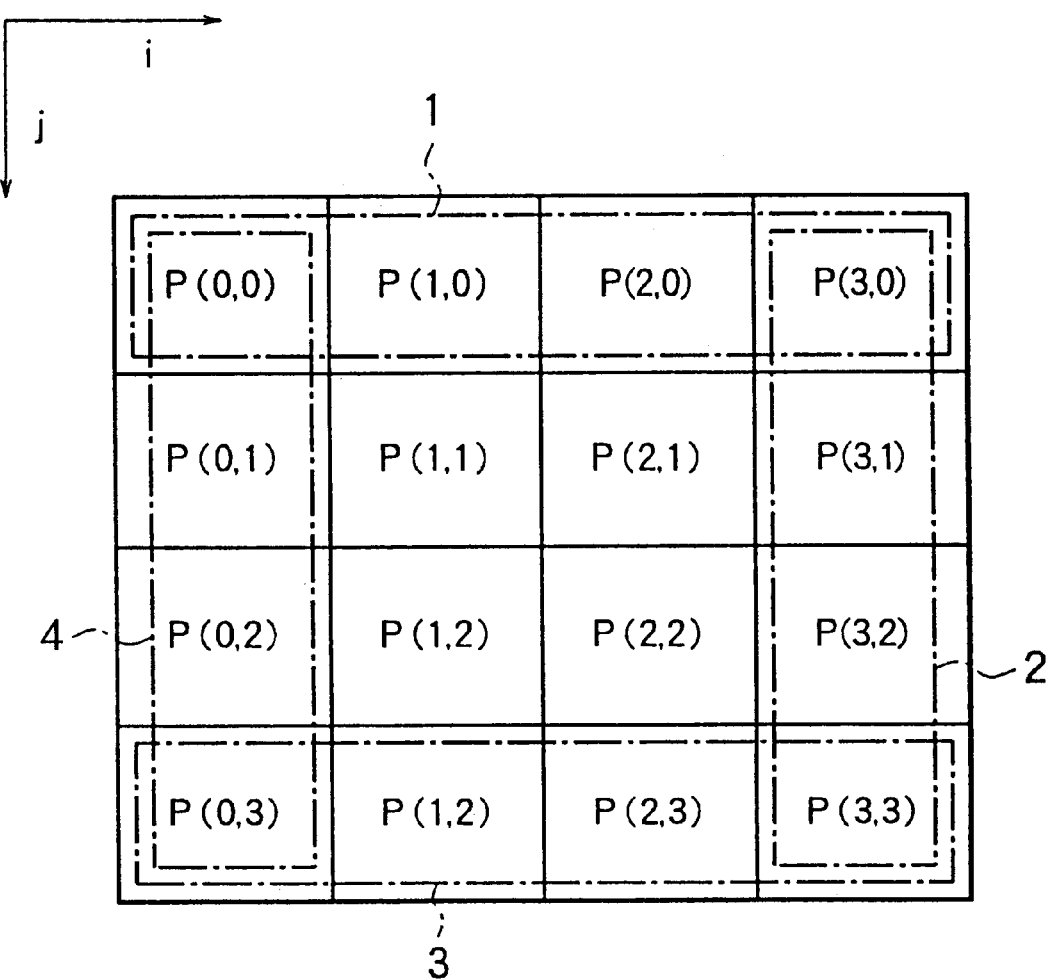
FIG. 3 illustrates a four-by-four block of pixels.

Some examples of intercept information and the patterns stored in the pattern table 22 may clarify the preceding description. The block size in these examples will be four-by-four. FIG. 3 indicates the pixel coordinates in the block and the four sides of the block. An internal edge can intercept a side at three possible points: between the first two pixels on the side, between the two middle pixels, or between the last two pixels. These three intercept points are indicated by values of one ('01'), two ('10'), and three ('11'), respectively, in the intercept information. Considering all possible combinations of intercept points, one sees that the block can be divided by an internal edge in fifty-four different patterns.

FIG. 4 is a chart showing the first few and last few of these patterns. The left column shows the intercept information output by the intercept locator 12, using binary notation, as indicated by the letter B. The middle column shows the pattern number to which the intercept information is converted by the conversion table 21. The right column shows the pattern stored in the pattern table 22. Each pattern is stored as a one-dimensional bit array, the order of bits in the array being equivalent to the scanning order of the pixels. Bits in the first region (white) are cleared to zero, while bits in the second region (hatched) are set to one.

The first row in this chart shows all-zero intercept information, the corresponding pattern number (zero), and the corresponding all-zero pattern, which is stored at offset address zero in the pattern table 22, for use when there is no internal edge.

The second row shows a pattern created by an edge that intercepts the top side between pixels P(0, 0) and P(1, 0), and intercepts the right side between pixels P(3, 0) and P(3, 1). The first two bits and second two bits of the intercept information both have the binary value '01' or 'one,' because the intercept points are the points between the first two pixels on each side. The intercept locator 12 outputs this information after receiving the side code '1100,' if the maximum values $\max|F(i-1, 0)-F(i, 0)|$ and $\max|F(3, j-1)-F(3, j)|$ occur when i equals one and j equals one, respectively.

The pattern in the next row intercepts the top side between pixels P(0, 0) and P(1, 0), and the right side between pixels P(3, 1) and P(3, 2). In the corresponding intercept information, the first two bits are '01' (i=1) and the second two bits are '10' (j=2).

The other patterns are similar. In the intercept information, a value of '01', '10', or '11' indicates, in the first two bits, an intercept point at the corresponding position on the top side; in the next two bits, an intercept point at the corresponding position on the right side; in the next two bits, an intercept point at the corresponding position on the bottom side; and in the last two bits, an intercept point at the corresponding position on the left side.

Referring again to FIG. 2, the selector 30 supplies the pixel values in the input image block to the partitioner 31 if the edge presence detector 11 detects the presence of an edge, and to the pixel value calculator 40 if no edge is detected.

When an edge is present, the partitioner 31 reads the corresponding pattern from the pattern table 22, divides the block into two regions corresponding to the two regions in the pattern, and sends the pixel values of the pixels in the two regions separately to the pixel value calculator 40.

The pixel value calculator 40 comprises a first region averager 41, a second region averager 42, and a block averager 43.

When an edge is present, the first region averager 41 receives the pixel values of pixels in the first region, corresponding to zeros In the pattern, calculates a separate sum of these values for each color, and divides these sums by the number of zeros in the pattern, as read from the region size table 23, to obtain average color values $C_1$ (cyan), $M_1$ (magenta), $Y_1$ (yellow), and $K_1$ (black). These average color values are supplied to the code assembler 50.

Similarly, the second region averager 42 receives the pixel values of pixels in the second region, corresponding to ones in the pattern, calculates a separate sum for each color, and divides by the number of ones in the pattern, as read from the region size table 23, to obtain average color values $C_2$, $M_2$, $Y_2$, and $K_2$, which are supplied to the code assembler 50.

When there is no edge, the block averager 43 receives all the pixel values in the block, calculates a separate sum for each color, and divides by the number of pixels in the block to obtain average color values C, M, Y, and K, which are supplied to the code assembler 50.

The code assembler 50 assembles the information received from the edge detector 10, coding parameter memory 20, and selector 30 into a codeword representing the coded value of the block. The codeword comprises a header giving edge and pattern information, followed by color information for each region into which the block is divided. The codeword is stored in an image memory, a transmission buffer memory, or the like, not shown in the drawing.

Figures 5, 6, 7:
FIG. 5 illustrates the header format in the first embodiment.
FIG. 6 illustrates a codeword in the first embodiment.
FIG. 7 illustrates another codeword in the first embodiment.

FIG. 5 shows the structure of the header when the block size is four-by-four, as in the preceding example. The header length is eight bits or one byte. The first bit is the edge detection result bit (E), which is set to one when the edge presence detector 11 detects an edge, and cleared to zero when no edge is detected. The next seven bits give the pattern number read from the conversion table 21. In FIG. 4 the pattern number was a six-bit number, so a leading zero is prefixed to make seven bits.

FIG. 6 shows the codeword structure when no edge is detected. The header (HDR) in FIG. 5 is followed by the average color values C, M, Y, and K received from the block averager 43, each average value occupying one byte.

FIG. 7 shows the codeword structure when an edge is detected. The header (HDR) in FIG. 5 is followed by the average color values $C_1$, $M_1$, $Y_1$, and $K_1$ received from the first region averager 41, then by the average color values $C_2$, $M_2$, $Y_2$, and $K_2$ received from the second region averager 42, each average color value occupying one byte.

Figure 8:
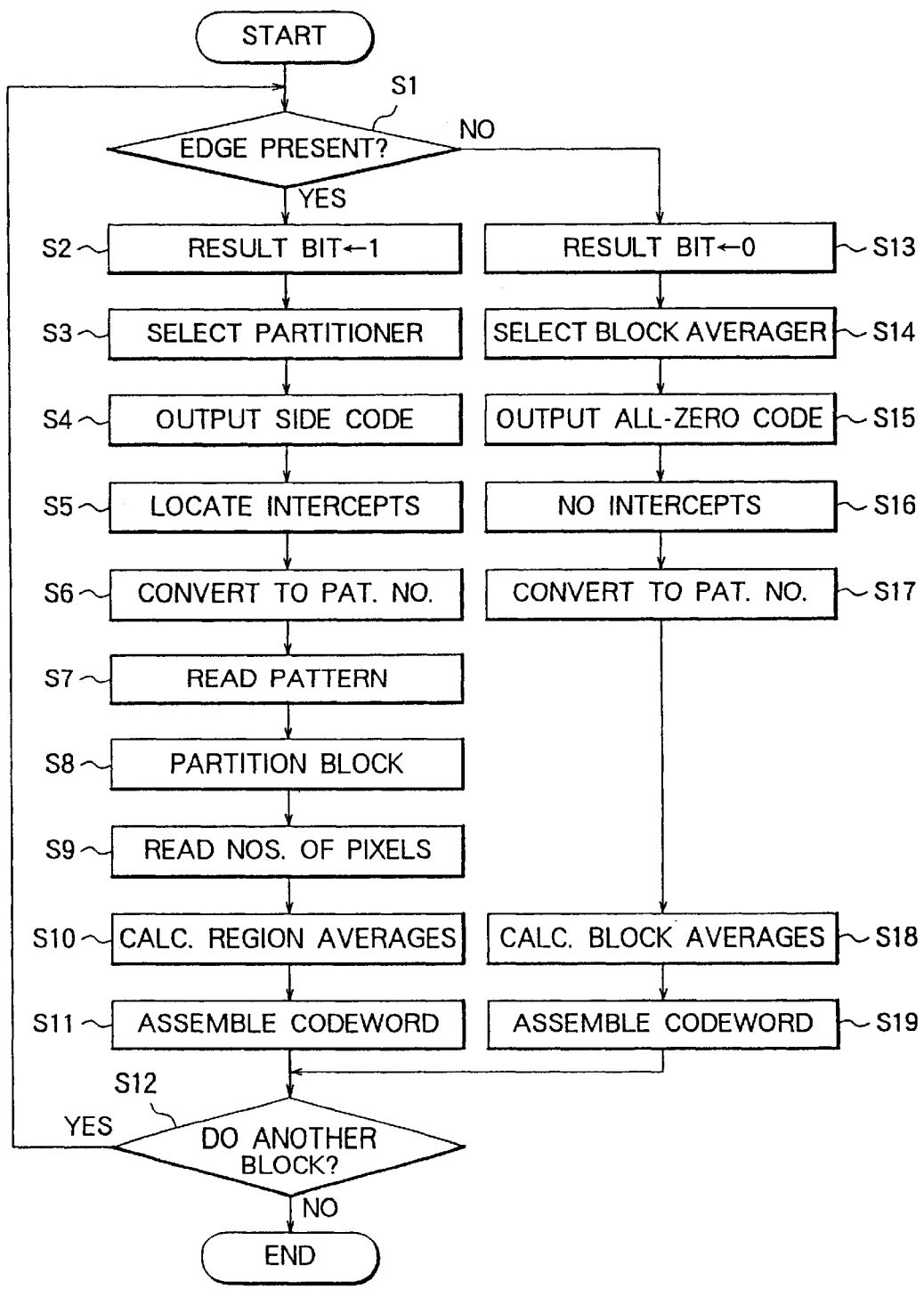
FIG. 8 is a flowchart illustrating the operation of the first embodiment.

The operation of the first embodiment will next be described with reference to the flowchart in FIG. 8.

Following input of a block of pixel values to the edge presence detector 11 and selector 30, in step S1, the edge presence detector 11 determines whether there is an internal edge in the block, by calculating the absolute differences H(1) to H(4) and comparing the largest two of these absolute differences with the threshold (k), as described above.

If an edge is detected, the image coder carries out steps S2 to S11, followed by step S12. If no edge is detected, the image coder carries out steps S13 to S19, followed by step S12.

In step S2, the edge presence detector 11 sets the edge detection result bit to '1' to notify the selector 30 and code assembler 50 that an edge has been detected. In step S3, the selector 30 selects the partitioner 31, which then receives the input pixel values. In step S4, the edge presence detector 11 sends a side code to the intercept locator 12 as described above, indicating which two sides are intercepted by the detected edge. In step S5, the intercept locator 12 locates the intercept point on each of these two sides, and outputs intercept information matching the block to one of the patterns in the pattern table 22. In step S6, the intercept information is converted to a pattern number by the conversion table 21. In step S7, the matching pattern is read from the pattern table 22.

In step S8, the partitioner 31 partitions the block by sending the pixel values of the pixels corresponding to the first region in the pattern to the first region averager 41, and the pixel values of the pixels corresponding to the second region to the second region averager 42. In step S9, the first region averager 41 reads the number of pixels in the first region from the region size table 23, and the second region averager 42 reads the number of pixels in the second region from the region size table 23. In step S10, the first region averager 41 calculates the average color values of the first region, and the second region averager 42 calculates the average color values of the second region. In step S11, the code assembler 50 sets the first bit (E) of the header of a new codeword to '1,' writes the pattern number output by the conversion table 21 into the following header bits, and appends the average color values output by the first region averager 41 and second region averager 42.

When no edge is detected, in step S13, the edge presence detector 11 clears the above-mentioned result bit to zero. In step S14, the selector 30 selects the block averager 43, which then receives the input pixel values. In step S15, the edge presence detector 11 sends the intercept locator 12 an all-zero side code ('0000'), indicating the absence of an internal edge. In step S16, the intercept locator 12 outputs all-zero intercept information ('0000000'), likewise indicating the absence of an edge. In step S17, the all-zero code output by the intercept locator 12 is converted by the conversion table 21 to the pattern number (zero) of the all-zero pattern in the pattern table 22. In step S18, the block averager 43 calculates the average color values of the block. In step S19, the code assembler 50 clears the first bit (E) of the header of a new codeword to '0', writes the pattern number ('0000000') output by the conversion table 21 into the following header bits, and appends the average color values output by the block averager 43.

In step S12, following step S11 or S19, if there is another block to be coded, a return is made to step S1. Otherwise, the coding process ends.

The coding method of the first embodiment is fast because it requires comparatively little memory access, and involves no operations more complicated than addition, subtraction, and the calculation of a few average values. This is in distinct contrast to the extensive mathematical calculations required by the JPEG and MPEG coding methods. A coder designed according to the first embodiment can be much smaller and less expensive than a JPEG or MPEG coder, as well as faster.

Block coding methods in general can lead to a blocky appearance when the image is decoded, but with the invented method, the blockiness tends to be concealed by the many blocks that are divided into regions.

Because each of the color values C(i, j), M(i, j), Y(i, j), and K(i, j), and each of the average values calculated by the averagers 41, 42, and 43, is a one-byte value, with four-by-four blocks, the compression ratio is 64:9 when an edge is detected, and 64:5 when no edge is detected. The inventors have found overall compression ratios of substantially 10:1 for typical images. An advantage of the invented method is that a compression ratio of at least 64:9 is assured, regardless of the complexity of the image, so it is not necessary to provide a large output buffer.

A further advantage is that the coded image information can be decoded extremely quickly, as described in the second embodiment below.

Figure 9:
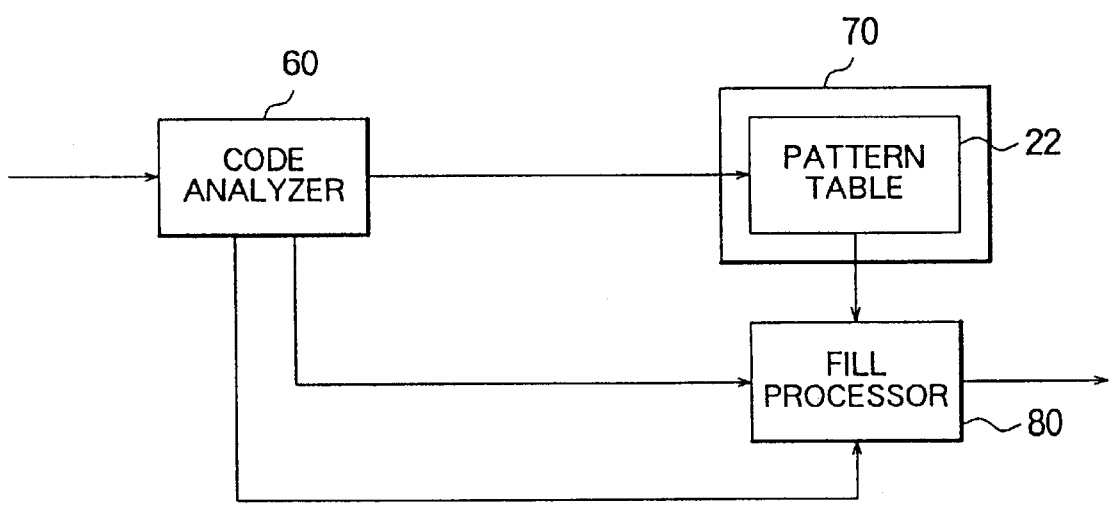
FIG. 9 is a block diagram of an image decoder according to a second embodiment of the invention.

Referring to FIG. 9, the second embodiment is an image decoder comprising a code analyzer 60, a decoding parameter memory 70, and a fill processor 80. The decoding parameter memory 70 has a pattern table 22 identical to the pattern table 22 in the first embodiment.

The code analyzer 60 analyzes codewords of the type output in the first embodiment, each representing one coded block. The code analyzer 60 begins by analyzing the E bit in the header. If this bit is set to one, indicating the presence of an edge, the code analyzer 60 reads the pattern number from the next seven bits of the header, and supplies the pattern number to the decoding parameter memory 70.

From the value of the E bit, the code analyzer 60 can also tell how much color information follows the header: eight bytes if the E bit is set to one, or four bytes if the E bit is cleared to zero. As described in the first embodiment, this information comprises average values for each color (cyan, magenta, yellow, and black) in each region, or average values for each color in the block as a whole. The code analyzer 60 supplies all of these average values, and the value of the E bit itself, to the fill processor 80.

When the code analyzer 60 supplies a pattern number to the decoding parameter memory 70, the decoding parameter memory 70 supplies the corresponding pattern from the pattern table 22 to the fill processor 80.

From the supplied information, the fill processor 80 creates a decoded block of pixel values. If the E bit is set to one, the block is divided into two regions matching the two regions in the pattern supplied by the decoding parameter memory 70. The fill processor 80 fills the first region with the pixel value given by the first four bytes of average color information supplied by the code analyzer 60, by copying these four bytes to each pixel in the first region, and fills the second region with the pixel value given by the second four bytes of average color information, by copying those four bytes to each pixel in the second region. If the E bit is cleared to zero, the fill processor 80 fills the entire block with the pixel value given by the four bytes of average color information supplied by the code analyzer 60.

Figure 10:
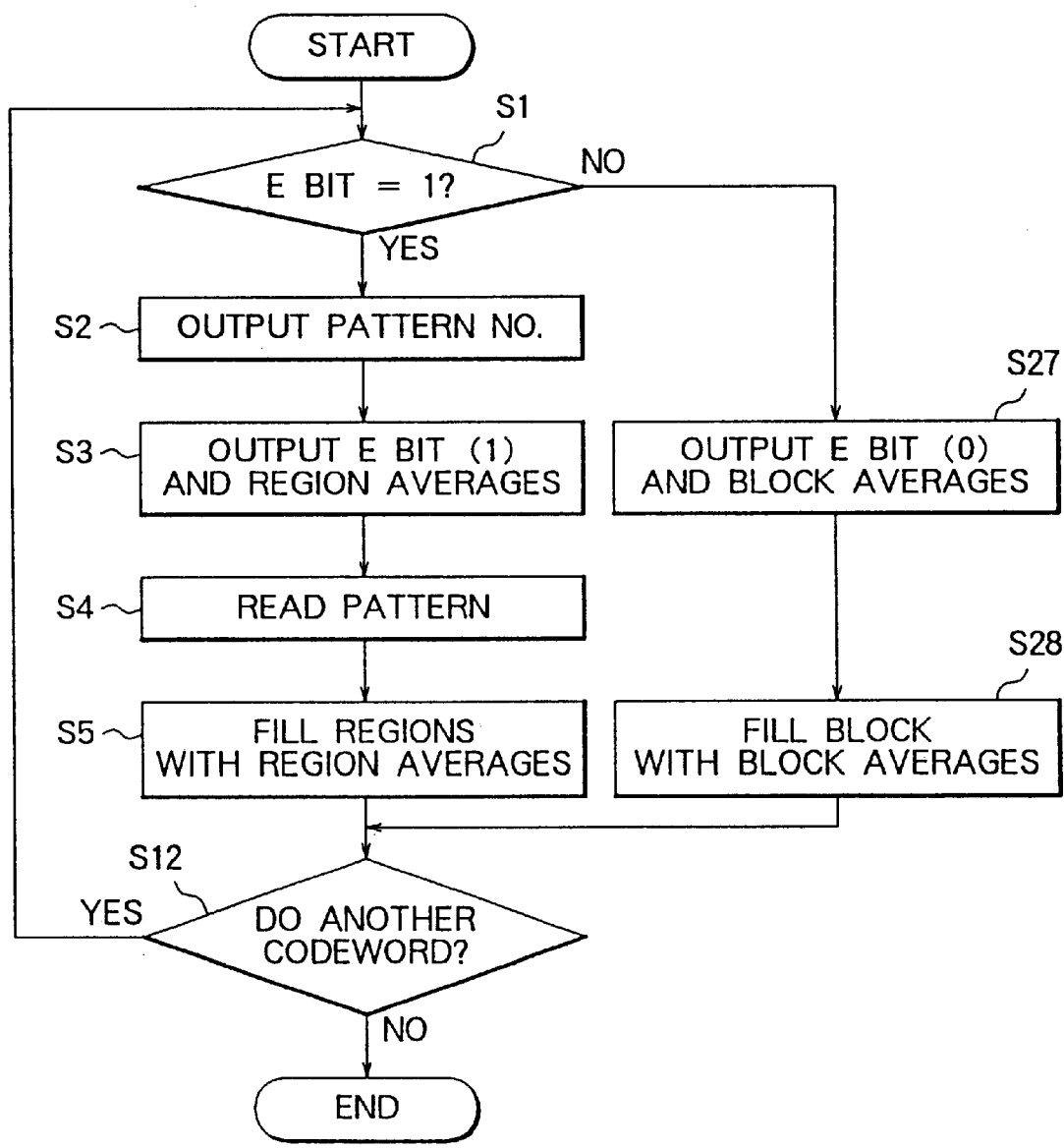
FIG. 10 is a flowchart illustrating the operation of the second embodiment.

The operation of the second embodiment will next be described with reference to the flowchart in FIG. 10.

Upon receiving a codeword, in step S21, the code analyzer 60 analyzes the E bit in the header. If this bit is set to one, steps S22 to S25 are carried out, followed by step S26. If this bit is cleared to zero, steps S27 and S28 are carried out, followed by step S26.

When the E bit is set to one, in step S22 the code analyzer 60 supplies the pattern number from the header to the decoding parameter memory 70. In step S23, the code analyzer 60 outputs the value ('1') of the E bit, together with the average color values for the first and second regions. In step S24, the pattern corresponding to the pattern number is read from the pattern table 22 in the decoding parameter memory 70. In step S25, the fill processor 80 fills each region with the supplied average color values of the region, thereby creating a decoded block.

When the E bit is cleared to zero, in step S27 the code analyzer 60 outputs the value ('0') of the E bit, together with the average color values for the entire block. In step S28, the fill processor 80 fills the entire decoded block with the supplied average values.

In step S26, following step S25 or step S28, if there is another codeword to be decoded, a return is made to step S21. Otherwise, the decoding process ends.

In complete contrast to the mathematically complex JPEG and MPEG decoding methods, the invented decoding method involves no arithmetic operations at all; the fill processor 80 simply copies the supplied average color values. The invented decoding process is therefore extremely simple and fast, and involves a minimum of memory access. An image decoder designed according to the second embodiment can be even smaller and less expensive than the coder of the first embodiment, and requires even less memory space.

In the preceding embodiments, one bit (the E bit) in the header was used to indicate the presence or absence of edges. This bit can be eliminated, as described in the next three embodiments, by considering a block with no internal edge to be a block in which all pixels are located in the first region and the second region is empty.

Figure 11:
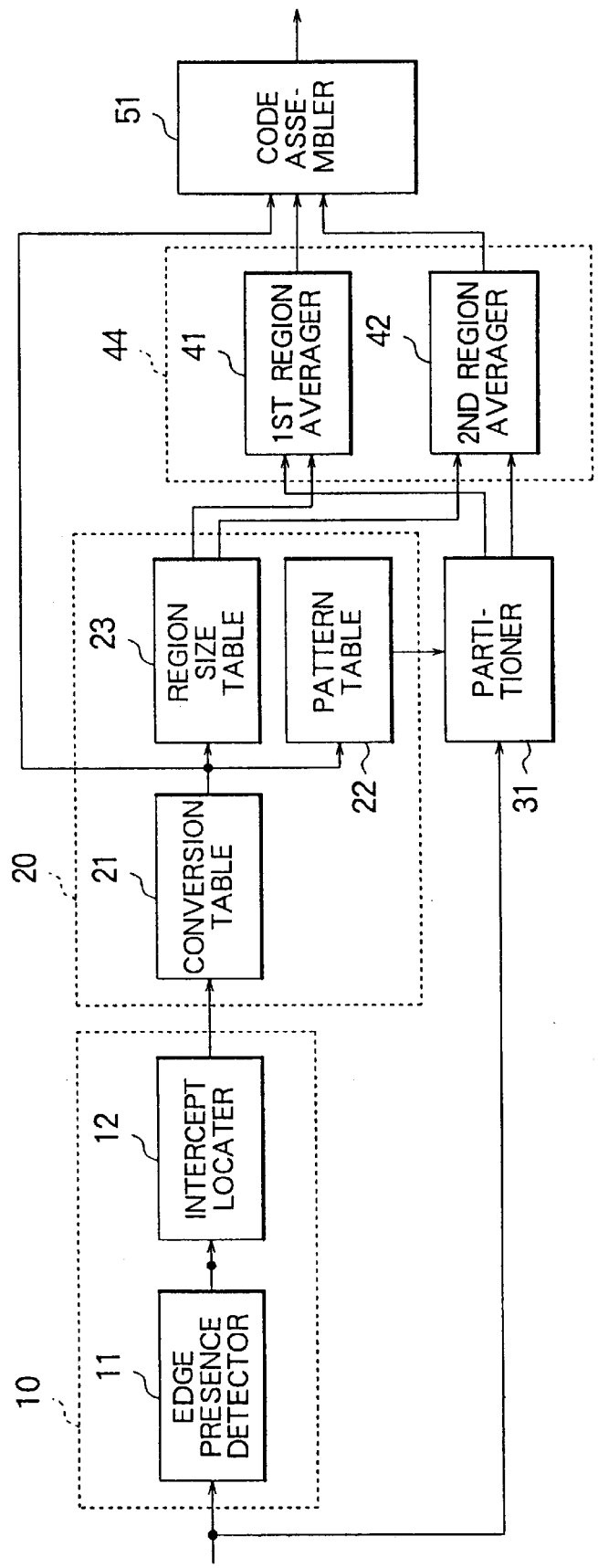
FIG. 11 is a block diagram of an image coder according to a third embodiment of the invention.

FIG. 11 shows a block diagram of an image coder according to a third embodiment of the invention, using the same reference numerals as in FIG. 2 for equivalent elements.

The edge detector 10 is identical to the edge detector 10 in the first embodiment, except that the edge presence detector 11 does not generate an edge detection result bit.

The coding parameter memory 20 is identical to the coding parameter memory 20 in the first embodiment, except that the region size table 23 also stores size information for the all-zero pattern in the pattern table 22. The number of pixels in the second region of this pattern is zero.

The pixel value calculator 44 comprises the first region averager 41 and second region averager 42 employed in the first embodiment, but has no block averager.

The code assembler 51 is generally similar to the code assembler 50 of the first embodiment, but receives only the outputs of the conversion table 21, first region averager 41, and second region averager 42, and does not write an E bit in the header of each codeword.

The third embodiment also lacks the selector 30 of the first embodiment. Input pixel values are supplied directly to the partitioner 31.

The operation of the third embodiment comprises steps S4 to S12 in FIG. 8, with minor modifications as explained below.

When an image block is received, the edge presence detector 11 outputs a four-bit side code as in the first embodiment (step S4), the intercept locator 12 detects the edge location and outputs intercept information (step S5), which is converted to a pattern number by the conversion table 21 (step S6), and the partitioner 31 reads the corresponding pattern from the pattern table 22 (step S7). The partitioner 31 then partitions the block, supplies the pixel values of pixels in the first region to the first region averager 41, and supplies the pixel values of pixels in the second region to the second region averager 42 (step S8). If no internal edge is detected, the side code and intercept information are all-zero, the pattern read from the pattern table 22 is the all-zero pattern, the partitioner 31 supplies all pixel values in the block to the first region averager 41.

The first region averager 41 and second region averager 42 read the number of pixels in their respective regions from the region size table 23 (step S9) and calculate average color values (step S10). If the second region averager 42 reads zero as the number of pixels in the second region, however, the second region averager 42 does not calculate an average value.

The code assembler 51 writes the pattern number given by the pattern table 22 in the header of a new codeword, and appends the average color values calculated by the first region averager 41 and second region averager 42 (step S11). If the pattern number is zero, there is only one set of average color values, calculated by the first region averager 41. For other pattern numbers, there are two sets of average color values, calculated by the first region averager 41 and second region averager 42.

If there is another block to be coded, the process returns through step S12 to step S4 to continue coding. Otherwise, the process ends.

The third embodiment provides the same effects and advantages as the first embodiment, but with a simpler configuration, because the function of the block averager 43 in the first embodiment is absorbed into the first region averager 41. By eliminating the E bit from the header of each codeword, the third embodiment also enables the compression ratio to be improved. Alternatively, longer pattern numbers can be accommodated, permitting more types of patterns.

Figure 12:
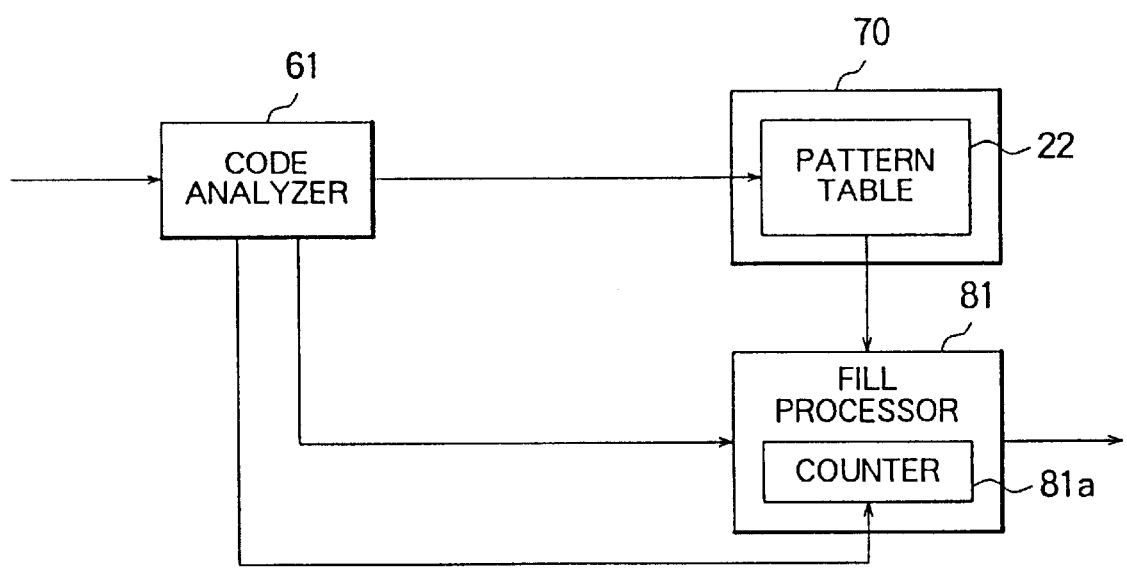
FIG. 12 is a block diagram of an image decoder according to a fourth embodiment of the invention.

FIG. 12 shows a block diagram of an image decoder according to a fourth embodiment of the invention, using the same reference numerals as in FIG. 7 for identical or equivalent elements. This image decoder receives codewords of the type output by the third embodiment.

The code analyzer 61 is generally similar to the code analyzer in the second embodiment, but since there is no E bit in the codeword header, the code analyzer 61 determines the number of bytes of average color information following by header by reading the pattern number in the header. A pattern number of zero indicates four following bytes of average color information; a non-zero pattern number indicates eight bytes. The code analyzer 61 supplies the pattern number to the decoding parameter memory 70, and the average color information to the fill processor 81.

The decoding parameter memory 70 is the same as in the second embodiment, comprising a pattern table 22 identical to the pattern table 22 in the third embodiment.

The fill processor 81 is similar to the fill processor in the second embodiment, but has an additional counter 81a that counts the number of pixels generated by the fill processor 81 from each codeword. The fill processor 81 stops generating pixels when this count reaches the number of pixels in one block.

The operation of the fourth embodiment comprises steps S22 to S25 in FIG. 10, with minor modifications as explained below.

When a codeword is received, the code analyzer 61 reads, analyzes, and outputs the pattern number (step S22), and reads and outputs the average color values (step S23), but does not read or output the nonexistent E bit. The pattern corresponding to the pattern number is output from the pattern table 22 in the decoding parameter memory 70 (step S23).

The fill processor 81 then fills the first and second regions of the decoded block by copying the supplied average color values, while the counter 81a counts each pixel thus filled. If the count reaches the number of pixels in one block before any pixels in the second region are filled, the fill processor 81 knows that the second region is empty, without having to be notified by the code analyzer 61, and stops filling automatically when the first region, constituting the entire block, is full. If the first region is filled before the count reaches the number of pixels in one block, the fill processor 81 proceeds to fill the second region, as in the second embodiment.

The fourth embodiment provides substantially the same advantages of small size and high speed as the second embodiment. The need to count pixels is to some extent offset by the lack of a need to analyze the E bit.

The fifth embodiment is a more advanced decoder that also decodes codewords of the type generated by the third embodiment, but has an additional resolution conversion function.

Figure 13:
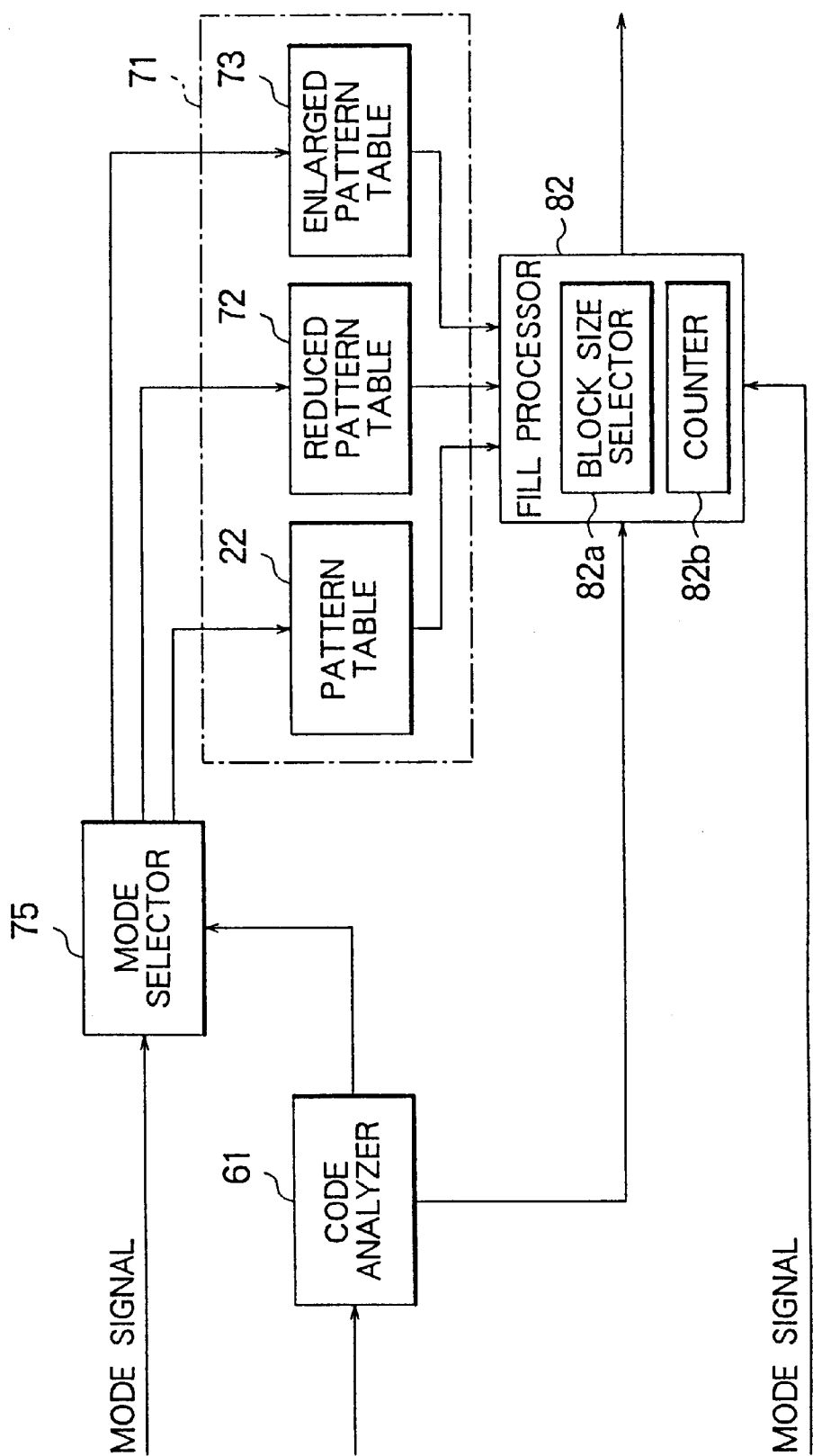
FIG. 13 is a block diagram of an image decoder according to a fifth embodiment of the invention.

FIG. 13 shows a block diagram of the fifth embodiment, using the same reference numerals as in FIG. 12 for identical or equivalent elements.

The fifth embodiment has the same code analyzer 61 as in the fourth embodiment. The decoding parameter memory 71 in the fifth embodiment has the same pattern table 22 as in the fourth embodiment, but also has a reduced pattern table 72 and an enlarged pattern table 73. These tables 72 and 73 are addressed by the same pattern numbers as the pattern table 22, but store patterns of different sizes. For example, if the pattern table 22 stores four-by-four patterns, the reduced pattern table 72 may store two-by-two patterns, and the enlarged pattern table 73 may store eight-by-eight patterns.

Figure 14:
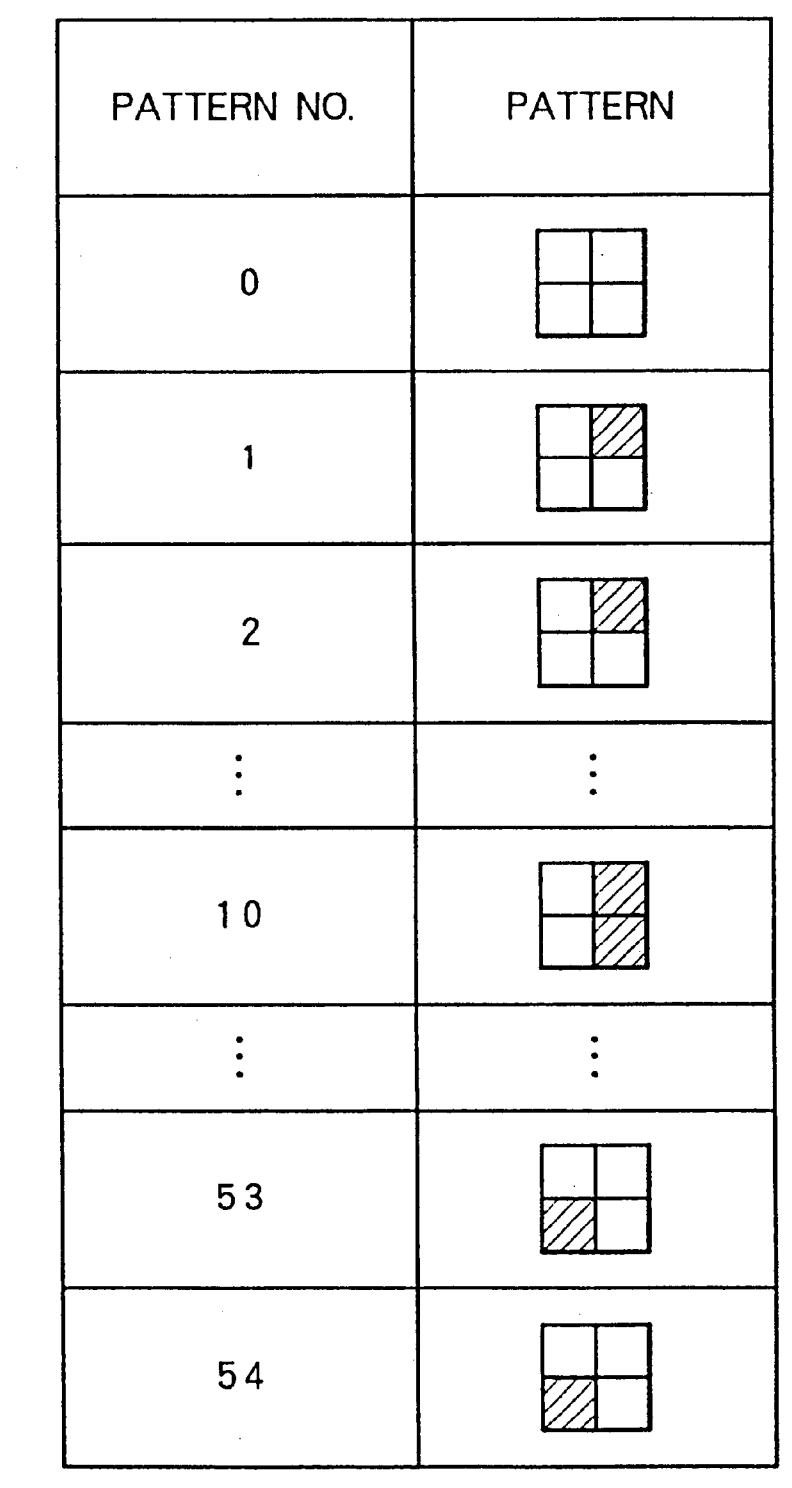

FIG. 14 illustrates some of the two-by-two patterns stored in the reduced pattern table 72 in this case, using white for the first region and hatching for the second region. Different pattern numbers may have the same pattern, as shown. Pattern number zero is still an all-zero pattern, with no second region.

FIG. 15 similarly illustrates some eight-by-eight patterns stored in the enlarged pattern table 73. These patterns can be obtained by expanding the patterns stored in the pattern table 22 by a factor of two horizontally and vertically.

Referring again to FIG. 13, the mode selector 75 receives a mode signal designating a normal mode, a reduced mode, or an enlarged mode. The mode signal is generated externally, in response to a command from a human user, for example. The mode selector 75 electrically couples the code analyzer 61 to the pattern table 22 when the normal mode is designated, to the reduced pattern table 72 when the reduced mode is designated, and to the enlarged pattern table 73 when the enlarged mode is designated. The decoding parameter memory 71 outputs a pattern only from the table to which the code analyzer 61 is coupled.

The fill processor 82 is generally similar to the fill processor 81 in the fourth embodiment, but has an additional block size selector 82a, as well as a counter b82b. The block size selector 82a receives the same mode signal as the mode selector 75, and selects the corresponding block size, e.g. four-by-four for the full-size mode, two-by-two for the reduced mode, or eight-by-eight for the enlarged mode. The fill processor 82 generates a decoded block of the selected size by filling pixels with the average color values supplied by the code analyzer 61. The counter b82b counts pixels as they are filled. The fill processor 82 stops filling when the count reaches the number of pixels in one block of the size selected by the block size selector 82a.

When the mode signal designates the normal mode, the fifth embodiment operates in the same way as the fourth embodiment, using a pattern read from the pattern table 22.

When the mode signal designates the reduced mode, the pattern is read from the reduced pattern table 72, and the block size selector 82a selects the reduced block size of this pattern. Aside from this difference, the operation is the same as in the fourth embodiment. The fill processor 82 fills pixels in the first region of the block with the average color values of this region, as supplied by the code analyzer 61, and fills the second region, if present, with the average color values of that region.

When the mode signal designates the enlarged mode, the pattern is read from the enlarged pattern table 73, and the block size selector 82a selects the expanded block size of this pattern. Aside from this difference, however, the operation is again the same as in the fourth embodiment, the fill processor 82 filling each region with the average color values of the region, as supplied by the code analyzer 61.

The fifth embodiment requires more memory space than the fourth embodiment, to store the additional pattern tables 72 and 73, but is still small in size and fast in operation. The advantage of the fifth embodiment is that reduction and expansion can be performed as part of the decoding process, instead of as a separate process after decoding is completed.

The reduction and expansion functions can accordingly by provided at low cost, with very high operating speed.

The preceding embodiments can be modified in various ways. In the first embodiment, for example, when no edge is detected in a block, it is not necessary to code the all-zero pattern number in the header; the edge detection result bit (E bit) suffices by itself. A block that is not partitioned into two regions can therefore be coded using the codeword format in FIG. 16, comprising a one-bit header, in which the one bit (E) is cleared to zero, followed by four bytes of color information. The compression ratio can be increased in this way.

The headers in FIGS. 7 and 16 can be regarded as a variable-length pattern identifier, the shortest pattern identifier (just one bit) being used for the single-region pattern, because this is the most common pattern. This scheme can be generalized by using variable-length pattern identifiers for all of the patterns.

In the fifth embodiment, mode selection information can be provided in an image header preceding the codewords containing the block information, instead of through a mode signal. In this case the code analyzer 61 analyzes the mode selection information and notifies the selector 75 and fill processor 82 of the selected mode.

The edge detector in the first and third embodiments is not limited to detecting the presence of internal edges by comparing corner pixel values; other methods can be employed. Nor is the edge detector limited to detecting one straight internal edge with two intercept points; other types of edge patterns can be detected, including patterns that partition the block into more than two regions. The pixel value calculator is not restricted to calculating average values; other methods can be used to calculate a representative pixel value for each region.

The pattern table 22 does not have to store a different pattern for each pattern number. Depending on the method of edge detection, the same pattern may be stored for different pattern numbers, as in the reduced pattern table 72 in FIG. 14.

The edge detectors, selectors, partitioners, pixel value calculators, code assemblers, code analyzers, and fill processors in the preceding embodiments can be provided in either hardware or software, or a combination thereof.

Those skilled in the art will recognize that further variations are possible within the scope claimed below.

What is claimed is:

1. A method of coding an image made up of pixels having pixel values by dividing the image into blocks, comprising the steps of:

providing a table of predetermined patterns identical in size and shape to said blocks, said patterns including a plurality of patterns each having at least two regions defined by at least one internal edge, said patterns being identified by pattern identifiers;

detecting internal edges in said blocks, thereby matching each block among said blocks with one of the patterns in said table;

calculating, for each block among said blocks, one representative pixel value for each region in the pattern matching said block, said one representative pixel value being calculated from the pixel values of the pixels in said block in positions corresponding to said region; and coding each said block by a pattern identifier identifying the pattern matching the block, accompanied by the representative pixel value calculated for each region in the pattern thus identified.

2. The method of claim 1, wherein said step of calculating comprises calculating, for each block among said blocks, for each region in the pattern matching said block, an average pixel value of the pixels in corresponding positions in said block.

3. The method of claim 1, wherein the patterns in said table have at most two regions each.

4. The method of claim 3, wherein the two regions in each pattern having two regions are defined by a straight internal edge.

5. The method of claim 4, wherein said step of detecting internal edges further comprises, for each said block, the steps of:

comparing differences between the pixel values of adjacent corner pixels in said block with a threshold value, to determine whether an internal edge is present;

if an internal edge is present, comparing said differences with each other to select two sides of said block intercepted by said internal edge; and if an internal edge is present, comparing the pixel values of adjacent pixels on said two sides, to determine where said internal edge intercepts each of said two sides.

6. The coding method of claim 1, wherein said step of coding each said block codes the pattern identifier of said pattern having only one region as a single bit.

7. A method of decoding coded image information coded by the method of claim 1, comprising the steps of:

providing at least two tables of predetermined patterns, each table among said tables storing patterns of a different size, each said table including a plurality of patterns each having at least two regions defined by at least one internal edge, said patterns being identified by the pattern identifiers used in the method of claim 1;

selecting one table among said tables, according to mode information;

for each pattern identifier in said coded image information, reading the pattern identified by said pattern identifier from the selected table; and for each pattern identifier in said coded image information, constructing a block made up of regions matching the regions in the pattern thus read, by filling each region in said block with the representative pixel value given for said region in said coded image information.

8. The method of claim 7, wherein said tables comprise:

a first table identical to the table employed in the coding method of claim 1;

a second table having patterns smaller than the patterns in said first table; and a third table having patterns larger than the patterns in said first table.

9. The method of claim 7, wherein each said table also includes a pattern having only one region.

10. The method of claim 1, wherein said table also includes a pattern having only one region.

11. A method of decoding coded image information coded by the method of claim 1, comprising the steps of:

providing a table identical to the table employed in the method of claim 1;

for each pattern identifier in said coded image information, reading the pattern identified by said pattern identifier from said table; and for each pattern identifier in said coded image information, constructing a block made up of regions matching the regions in said pattern, by filling each region in said block with the representative pixel value given for said region in said coded image information.

12. An image coder for coding an image made up of pixels having values by dividing the image into blocks, comprising:

a coding parameter memory storing patterns identical in size and shape to said blocks, said patterns including a plurality of patterns each having at least two regions defined by at least one internal edge, said patterns being identified by pattern identifiers;

an edge detector coupled to said coding parameter memory, for detecting internal edges in said blocks, thereby matching each block among said blocks with one of the patterns in said coding parameter memory;

a partitioner coupled to said coding parameter memory for dividing the pixels in each said block into regions corresponding to the regions in the pattern matching said block;

a pixel value calculator coupled to said partitioner for calculating a representative pixel value for each region in each said block said representative pixel value being calculated from the pixel values of the pixels in said region in said block; and a code assembler coupled to said pixel value calculator, for coding each said block by a pattern identifier identifying the pattern matching the block, accompanied by the representative pixel value calculated for each said region in said block.

13. The image coder of claim 12, wherein said edge detector further comprises:

an edge presence detector for comparing differences between the pixel values of adjacent corner pixels in one said block with a threshold value, thereby determining whether an internal edge is present, and if an internal edge is present, comparing said differences with each other, thereby selecting two sides of said block intercepted by said internal edge; and an intercept locator for comparing the pixel values of adjacent pixels on said two sides, thereby determining where said internal edge intercepts each of said two sides, and outputting corresponding intercept information.

14. The image coder of claim 13, wherein said coding parameter memory further comprises:

a conversion table for converting said intercept information to said pattern identifier;

a pattern table storing said patterns at addresses corresponding to said pattern identifiers; and a region size table storing information indicating how many pixels are contained in each said region in each said pattern.

15. The image coder of claim 12, wherein said pixel value calculator comprises at least one averager for calculating an average value of the pixel values of the pixels in a region as the representative pixel value of said region.

16. The image coder of claim 11, wherein said pixel value calculator comprises a plurality of averagers, each said averager among said averagers calculating an average value for just one region per block.

17. The image coder of claim 12, further comprising a selector coupled to said edge detector, for providing the pixel values of the pixels constituting one block to said partitioner when said edge detector detects an internal edge in said block, and providing said pixel values directly to said pixel value calculator when said edge detector does not detect an internal edge in said block.

18. An image decoder for decoding coded image information coded by the image coder of claim 12, comprising:

a decoding parameter memory storing patterns at addresses corresponding to the pattern identifiers employed in said claim 12, said patterns including a plurality of patterns each having at least two regions defined by at least one internal edge; and a fill processor coupled to said decoding parameter memory, for reading a pattern from said decoding parameter memory, according to a pattern identifier in said coded image information, and constructing a block made up of regions matching the regions in said pattern, by filling each region in said block with the representative pixel value given for said region in said coded image information.

19. The image decoder of claim 18, wherein said patterns also include a pattern having only one region.

20. The image decoder of claim 18, wherein said fill processor has a counter for counting pixels filled in by said fill processor, and said fill processor stops filling when said counter indicates that said block has been completely filled in.

21. The image decoder of claim 18, wherein said decoding parameter memory comprises a plurality of tables, each table among said tables storing patterns of a different size, each said table including a plurality of patterns each having at least two regions defined by internal edges, and said image coder further comprises a mode selector coupled to said decoding parameter memory, for receiving mode information and selecting one of said tables according to said mode information.

22. The image decoder of claim 21, wherein each said table also includes a pattern having only one region.

23. The image decoder of claim 21, wherein said decoding parameter memory comprises:

a first table identical to the table employed in the image coder of claim 12;

a second table having patterns smaller than the patterns in said first table; and a third table having patterns larger than the patterns in said first table.

24. The image decoder of claim 21, wherein said fill processor comprises:

a block size selector for selecting a size equal to the size of the patterns in the table selected by said mode selector, thereby causing said fill processor to fill in a block of the selected size; and a counter for counting pixels filled in by said fill processor, causing said fill processor to stop filling when said fill processor has filled in a number of pixels matching the size selected by said block size selector.

25. The image coder of claim 12, wherein said patterns also include a pattern having only one region.

26. The image coder of claim 25, wherein said code assembler codes the pattern identifier of said pattern having only one region as a single bit.

\* \* \* \* \*